United States Patent [19]
Beach et al.

[11] 3,771,168
[45] Nov. 6, 1973

[54] METHOD FOR APPROXIMATING WITH LINEAR SEGMENTS A CURVATURE ON A THREE-DIMENTIONAL SURFACE

[75] Inventors: Robert C. Beach; Stanley L. Myers, both of Cincinnati, Ohio

[73] Assignee: Cincinnati Milacron, Inc., Cincinnati, Ohio

[22] Filed: July 21, 1971

[21] Appl. No.: 164,590

[52] U.S. Cl. .................................. 444/1, 235/152
[51] Int. Cl. ........................ G06f 7/38, G06f 15/46
[58] Field of Search ............ 444/1; 235/150, 152 IE, 235/151.11

[56] References Cited
UNITED STATES PATENTS
3,629,558    12/1971    Coggin ............................ 235/151.1

Primary Examiner—Eugene G. Botz
Attorney—Howard T. Keiser et al.

[57] ABSTRACT

A method of linear curve fitting is disclosed for use with a scanning apparatus which traces a curvature on a three-dimensional surface and produces a plurality of sample points. A computer within the apparatus is responsive to the sample points and by executing the disclosed method selects a number of said points to define linear segments along the curvature. The linear segments are defined to approximate the curvature within a predetermined tolerance.

5 Claims, 7 Drawing Figures

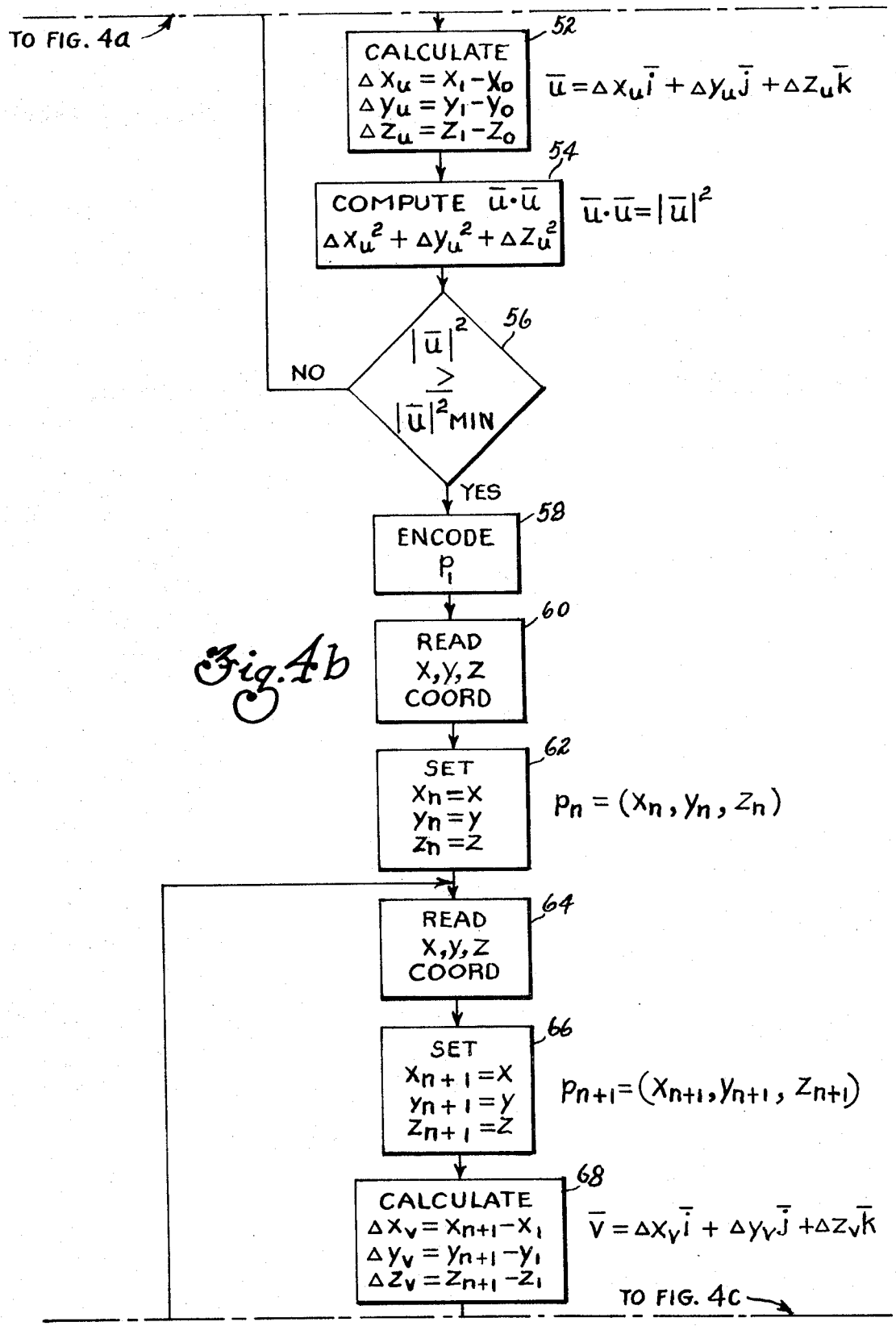

METHOD FOR APPROXIMATING WITH LINEAR SEGMENTS A CURVATURE ON A THREE-DIMENTIONAL SURFACE

BACKGROUND OF THE INVENTION

The invention relates generally to the area of curve fitting methods; and specifically, the invention discloses a method of fitting linear segments to a curvature in three-dimsional space within a predetermined tolerance.

Since the advent of numerical controls for machine tools, the economic and efficient generation of input data for the control has been a substantial problem. Recently, a number of scanning machines have been developed. These machines scan the surface of the model representing the configuration of a finished workpiece and produce output data signals defining said configuration. The data signals can be in a form which may be directly input to the numerical control. The problems of generating data signals for a numerical control are described in detail in U.S. Pat. No. 3,624,371, issued on Nov. 30, 1971 and assigned to the present assignee. Applicant's invention is concerned with a method for selecting a number of sample points along a curvature to define linear segments thereby approximating the curvature within a predetermined tolerance. There are several linear curve fitting methods found in the prior art. However, the prior art methods known to applicant are for two dimensional applications. In other words, a scanning plane is predetermined in which curve fitting is executed. The extension of the two-dimensional method to a three dimensional application would require substantially more complex calculations. Thus a computer of relatively simple structure would not be practical. In addition, the inherent disadvantages of slow execution time and unacceptably long records, which are inherent in many of the two dimensional methods, would also be present.

Applicants disclose a method of linear curve fitting that minimizes the disadvantages of the prior art methods. Further, applicant's method implements a unique calculation process that may be executed on a computer of relatively simple structure.

SUMMARY OF THE INVENTION

The present invention discloses a method for use with a scanning apparatus and a computer for approximating within a predetermined tolerance a curvature of a three-dimensional surface. The scanning apparatus produces a plurality of sample points along the curvature. The computer reads and stores two of the sample points thereby defining a first linear segment. Each linear segment determines an axis of a cylindrical boundary having a radius equal to the predetermined tolerance. The computer calculates an end point for each successive linear segment by selecting a final sample point on the curvature lying within the cylindrical boundary.

BRIEF DESCRIPTION OF THE DRAWINGS

FIGS. 4a–4d are a detailed flow chart illustrating the necessary steps of the preferred embodiment.

DESCRIPTION OF THE PREFERRED EMBODIMENT

Figure 1:
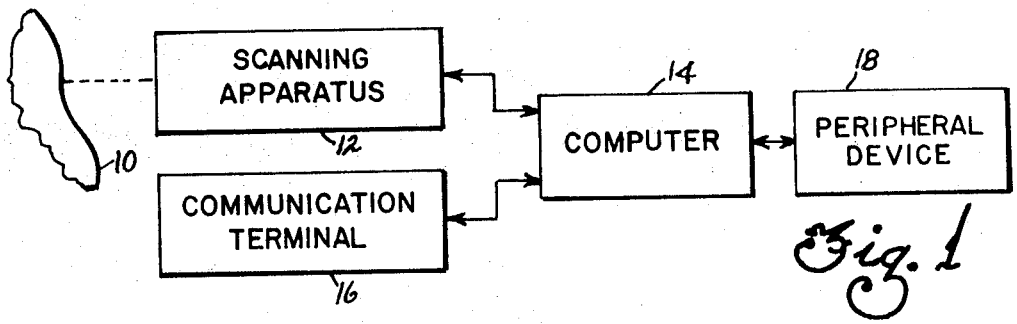
FIG. 1 is a block diagram of the apparatus used to execute the disclosed invention.

FIG. 1 is a block diagram illustrating a combination of elements that may be used to execute the disclosed invention. A complete and detailed description of a unique embodiment of such an apparatus is contained in the earlier referenced U.S. Pat. No. 3,624,371. Further, the devices shown are commercially available, and a detailed discussion will not aid the disclosure of applicants' method. The surface of a model 10 is traced by a scanning apparatus 12 which generates a number of sample points along the surface. A computer 14 is connected to the scanning apparatus and in response to the sample points executes the disclosed method. A communication terminal 16, e.g., a Teletypewriter, is used to transfer information to and from the computer 14. An peripheral device 18, e.g., a tape punch, is responsive to the computer for storing the output data defining the linear segments which approximate the curvature of the model 10.

Figure 2:
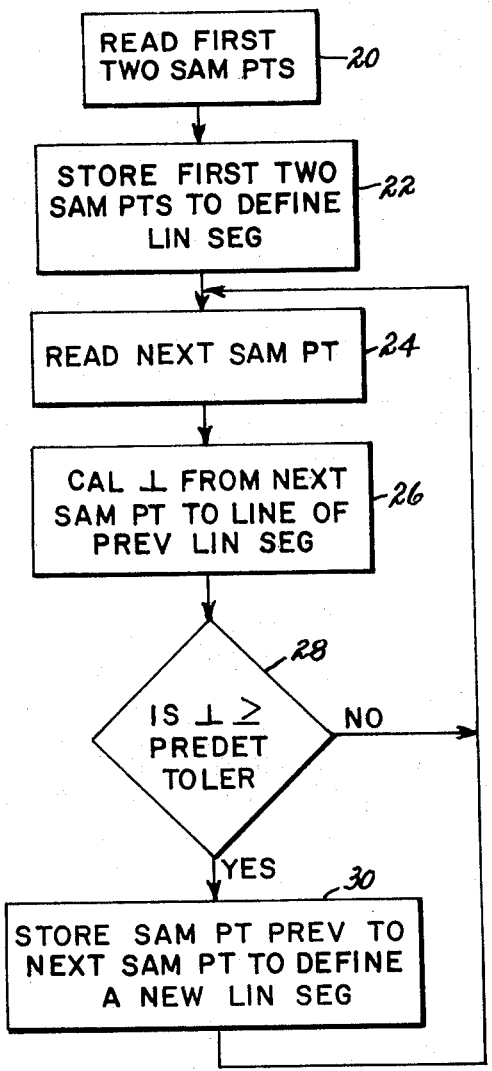
FIG. 2 is a general flow chart showing the basic steps of applicants' method.

FIG. 2 is a general flow chart showing the basic steps of the disclosed method. Operation blocks 20 and 22 define the steps of reading and storing the first two sample points, thereby defining a first linear segment. The remainder of the method is cyclic in nature and is used to define the other linear segments along the curvature. Operation block 24 defines the step of reading another sample point into the computer. Next, block 26 requires the computation of the magnitude of a perpendicular from the other sample point to a line coincident with a previously defined linear segment. Decision block 28 defines the step of comparing the magnitude of the perpendicular with the predetermined tolerance. If the magnitude of the perpendicular is not greater than or equal to the predetermined tolerance, the process returns to the step defined by operation block 24; and a further sample point along the curvature is detected. If the magnitude of the perpendicular exceeds the predetermined tolerance, operation block 30 requires a sample point immediately preceding the present sample point be encoded. Hence, a second linear segment is defined from the end point of the first linear segment to the encoded sample point. Of course, the immediately preceding sample point would be within the predetermined tolerance.

It should be noted that the exact nature of the comparing step is not critical. For example, within a computer, one can readily determine the resolution of a number of interest. Therefore, it would be possible to detect when the magnitude of the perpendicular is equal to the predetermined tolerance, and the linear segment could be terminated at that point. As earlier described, a presently existing linear segment represents an axis of a cylindrical boundary having a radius equal to the predetermined tolerance. The real object of the method is to select the final sample point on the curvature lying within the cylindrical boundary. This final sample point defines the end point of the next linear segment which in turn defines an axis of another cylindrical boundary. This process continues until the entire curvature has been approximated.

Figure 3:
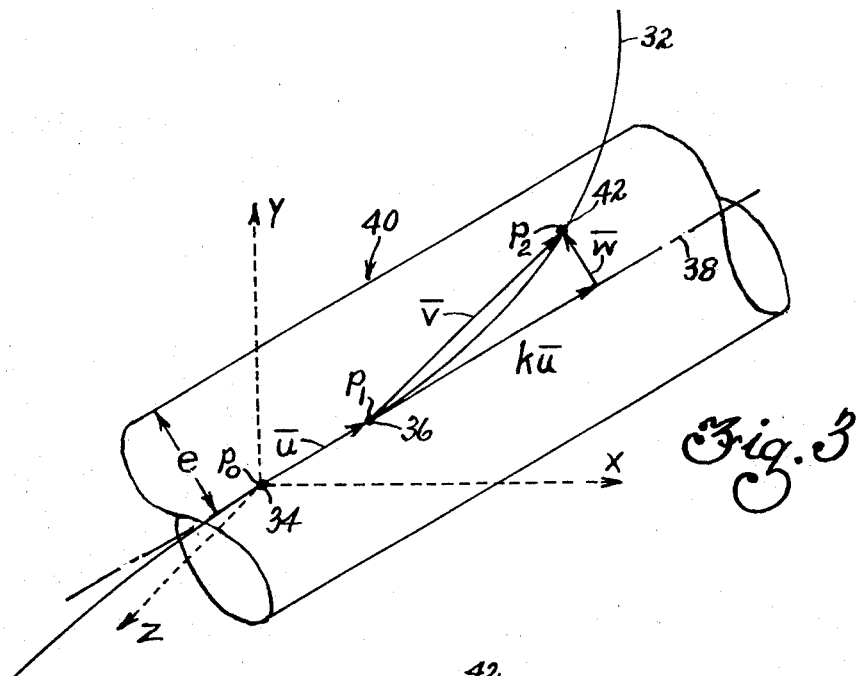
FIG. 3 is a diagram illustrating the vector relationships used in executing the preferred embodiment of applicants' invention.

The question now arises as to how to execute the general steps of the process defined in FIG. 2. One could use trigonometric identities and equations or define a solution by simultaneously solving equations of the geometric elements involved. However, applicants have chosen a vector algebra approach which is accurate and relatively simple thus permitting the use of a computer having a relatively simple structure. Referring to FIG. 3, a curvature 32 on a surface in space is to be approximated by linear segments defined by applicants invention. A first two sample points, $P_0$ and $P_1$, 34 and 36 respectively are detected and a first linear segment is defined therebetween. This segment defines an axis 38 of a cylindrical boundary 40 having a radius equal to a predetermined tolerance. Successive sample points are tested to select the last one lying within the cylindrical boundary. The theory of the testing process will be described with respect to sample point $P_2$, 42. Let the linear segment points 34 and 36 define a reference vector $\bar{u}$. Next, a test vector $\bar{v}$ is defined between sample points 36 and 42. A vector $\bar{w}$ representing the perpendicular distance from the point 42 to the line 38 can be determined by the following vector subtraction:

$$\bar{w} = \bar{v} - k\bar{u} \quad (1)$$

Further, we know from vector algebra that if $\bar{w}$ is perpendicular to $k\bar{u}$, the dot product of $\bar{w}$ and $k\bar{u}$ is zero. Therefore, $$\bar{w} \cdot k\bar{u} = 0 \quad (2)$$
$$k(\bar{w} \cdot \bar{u}) = 0$$
$$\bar{w} \cdot \bar{u} = 0 \quad (3)$$

Substituting equation (1) into equation (3) and solving for $k$ we have $$k = \left[\frac{\bar{u} \cdot \bar{v}}{|\bar{u}|^2}\right] \quad (4)$$

Substituting the value the $k$ into equation (1), we can solve for $\bar{w}$ by using the vectors $\bar{u}$ and $\bar{v}$ which are readily available.

$$\bar{w} = \bar{v} - \left[\frac{\bar{u} \cdot \bar{v}}{|\bar{u}|^2}\right]\bar{u} \quad (5)$$

Consequently, we can readily solve for the magnitude of $\bar{w}$ and compare it to the predetermined tolerance.

Figure 4A:
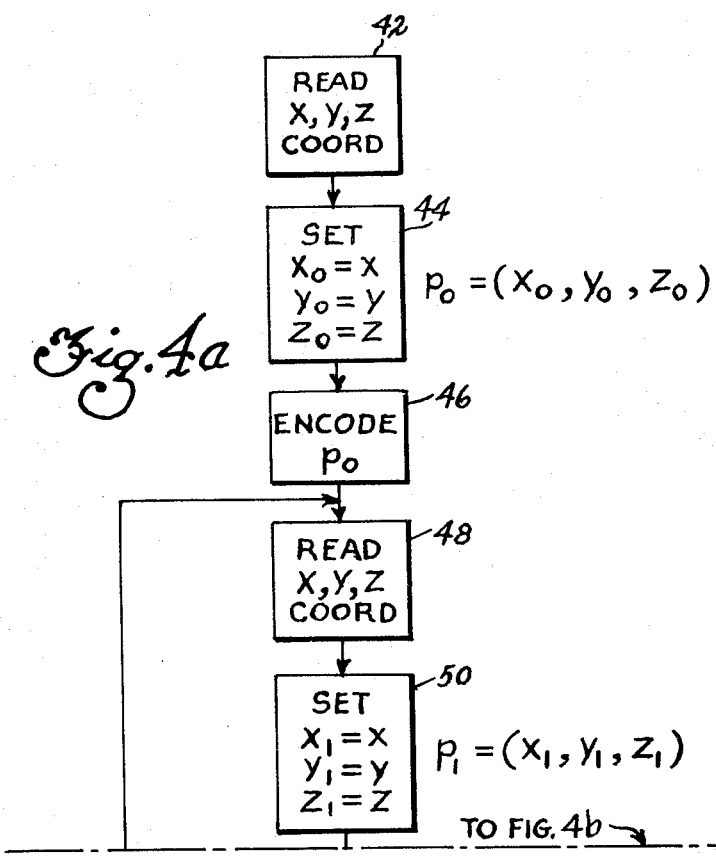
Figure 4C:
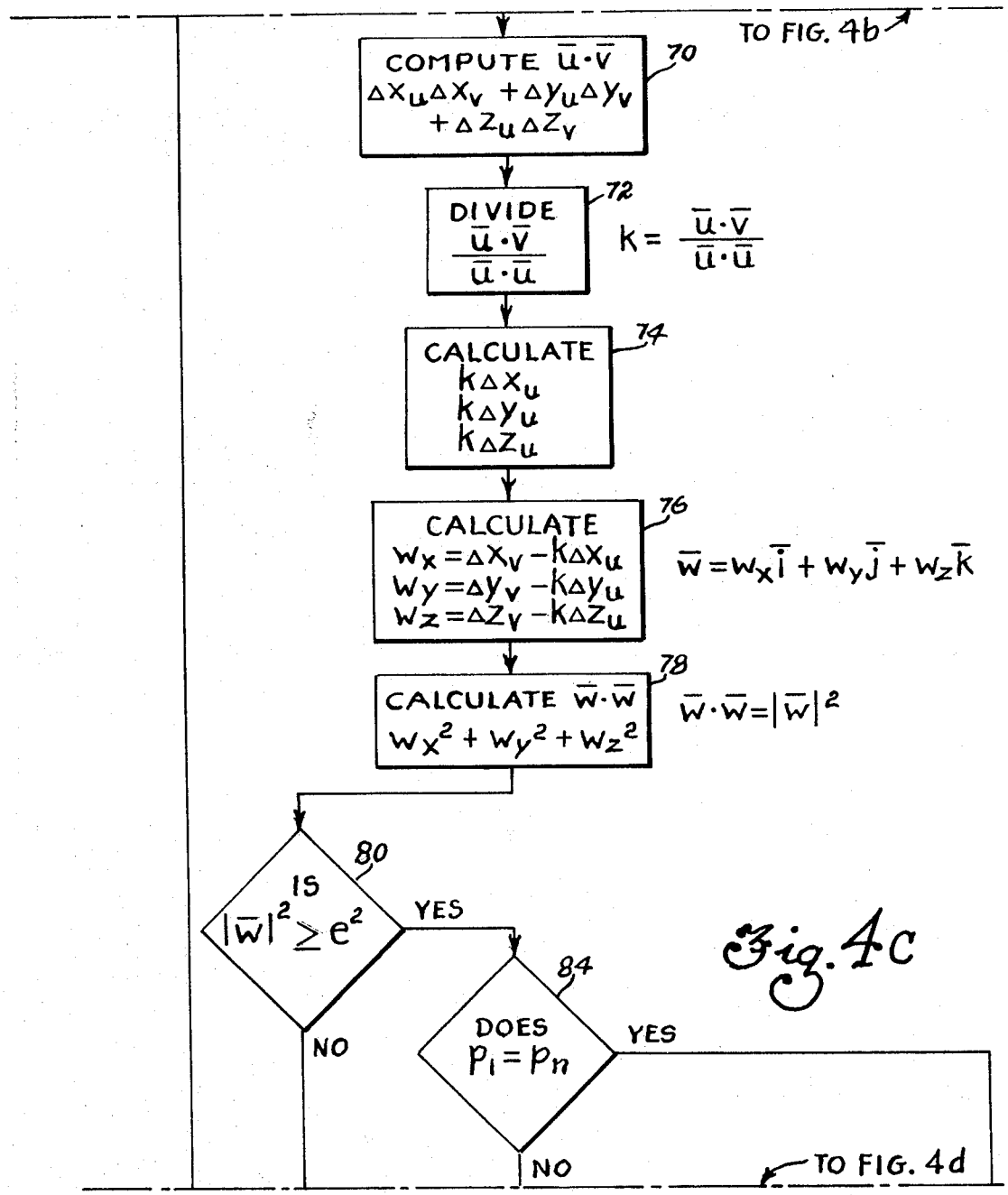
Figure 4D:
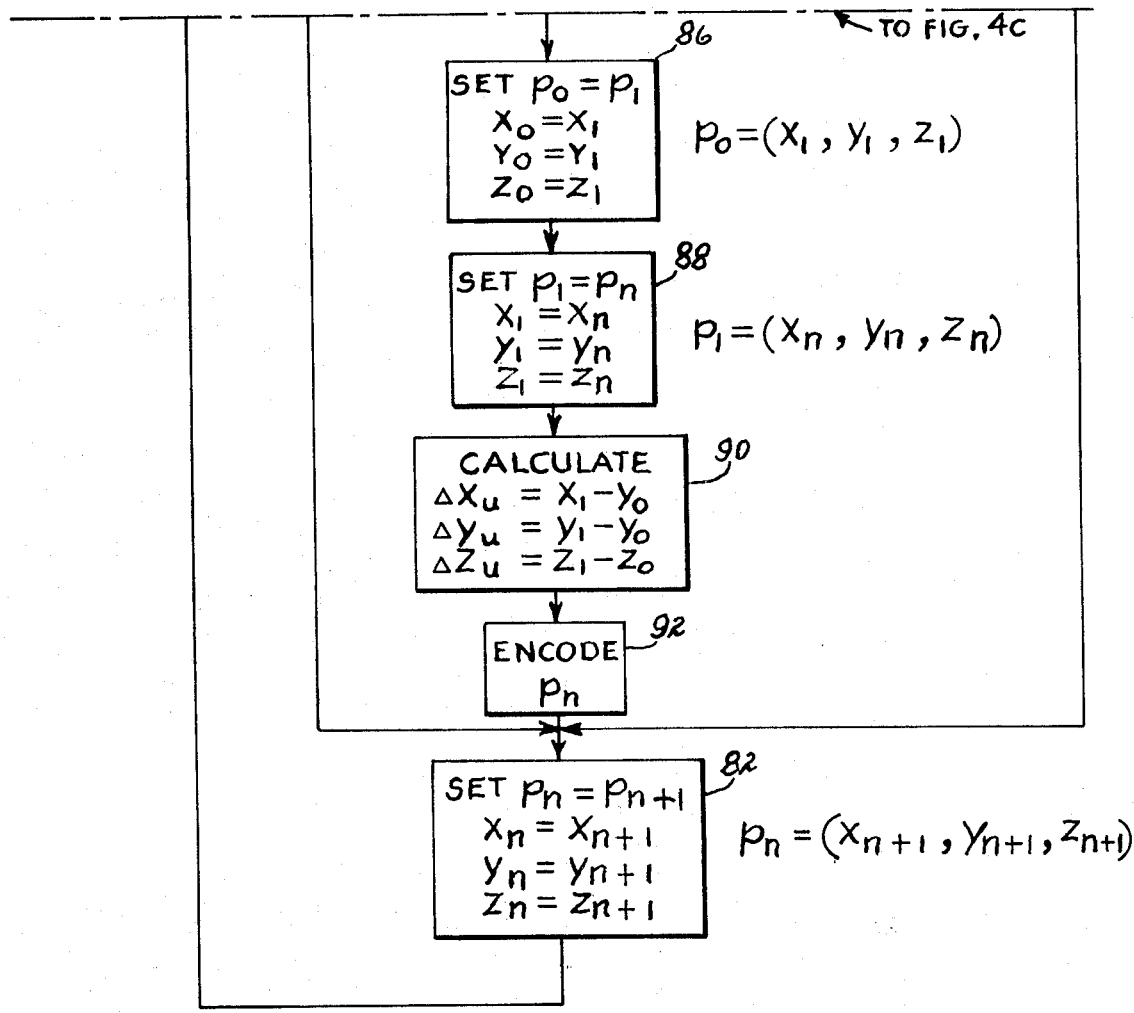

A detailed flow chart defining this method is illustrated in FIG. 4. Blocks 42, 44 and 46 require that the first sample point be read and stored. Next, as shown in Blocks 48 through 54, a second sample point is detected and the square of the magnitude of a reference vector $\bar{u}$ from $P_0$ to $P_1$ is calculated. Decision block 56 determines if the magnitude of the first reference vector $\bar{u}$ is zero. Calculations in later steps require a division by the magnitude of the reference vector; and therefore it cannot have a zero magnitude. Further, it is desirable that the magnitude of the vector have an arbitrary minimum magnitude. If the reference vector magnitude is not greater than or equal to the predetermined minimum value the process returns to block 48 to read another point. However, if the reference vector magnitude is sufficient, block 58 indicates that the second sample point is stored thereby defining a first linear segment between the first two sample points. By defining the first reference vector and the first linear segment, a first cylindrical boundary about the reference vector having a radius of the predetermined tolerance is also defined.

Blocks 60 and 62 require the next point be read and stored within the computer with no tolerance test being performed. With any curve fitting method, there exists a minimum approximation which is a function of the resolution of the sampling process. Consequently, after a linear segment and corresponding vector having been defined, there is no value in performing a tolerance check on the very next sample point. Because this point represents the minimum possible approximation, one may reasonably assume that this point is within the predetermined tolerance. Consequently, the next sample point $P_n$ is stored within the computer, and a subsequent sample point $P_{n+1}$ is read.

As indicated by blocks 64 through 70, a further sample point $P_{n+1}$ is read, and a test vector $\bar{v}$ is calculated from the end point of the last linear segment to the point $P_{n+1}$. In addition, the dot product between the test vector and the reference vector is calculated. In the steps of blocks 72 and 74 the components of a third vector are defined. The third vector represents the projection of the test vector $\bar{v}$ onto a line coincident with the reference vector $\bar{u}$. Next, as defined in block 76, the vector components of a prependicular $\bar{w}$ from the sample point $P_{n+1}$ to an extension of a reference vector $\bar{u}$ are found by subtracting the components of the third vector from the components of the test vector.

As earlier described, the magnitude of the perpendicular must be compared with the predetermined tolerance. The calculation of this magnitude requires the execution of a square root which is inefficient when using a computer of a relatively simple structure. Therefore, as indicated in blocks 78 and 80, the square of the perpendicular magnitude is compared with the square of the predetermined tolerance. If the square of the perpendicular magnitude is less than the square of the predetermined tolerance, block 82 sets the coordinate values of the present point $P_{n+1}$ into storage defining the previous point $P_n$, and the process returns to block 64 to read a new set of coordinates. If the square of the perpendicular magnitude is greater than the square of the predetermined tolerance, a check is made in decision block 84 to determine if the previous point, $P_n$ is the same as the end point of the last linear segment. Again, this is required to make sure the process does not define a linear segment or a reference vector having a zero magnitude. If for some reason, these two points are identical, block 82 requires the point $P_n$ be redefined by the coordinates of the point $P_{n+1}$; and the process returns to block 64 to detect a new sample point. If the points are not equal, it is safe to define a new linear segment; therefore, in blocks 86 through 92, the points $P_0$ and $P_1$ are redefined by the coordinates of the points $P_1$ and $P_n$, respectively. A new reference vector is calculated, and the point $P_n$ is stored. A new linear segment is defined thereby defining a new cylindrical boundary. After redefining the sample point $P_n$, the process returns to block 64 where the next sample point is read.

Appended to this specification is a print out of a program for the above process, the program represents one embodiment for directing the operation of a scanning machine of the type described in the co-pending application earlier referenced. The program is written in assembly language for use on a CIP/2100 computer commercially available from Cincinnati Milacron Inc. Pages 16 through 23 constitute a main program for executing the curve fitting method disclosed herein. The program is part of an overall computer program which controls all the operations of a scanning apparatus as shown in FIG. 1. The omitted portions of the main program are relatively standard and are not necessary for a complete understanding of the disclosed invention. Each remaining sheet of program defines a subroutine which is called out in the main program. The name of each subroutine is self-explanatory and is found in the first line of the comments section on each page.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

```
AP810 VERSION 3.0                                                            SCN001
05FB   08              SCAN    ROL                                           SCN002
05FC   E092                    LDA    LON       SCAN MODE                    SCN003
05FE   3168                    IBA    3,8                                    SCN004
0600   F13C                    STA    STATUS    GET STATUS - MODE SEL., ERROR COND, PICK  SCN005
0602   DF0F                    ANV=   X'0F'     SAVE STATUS                  SCN006
0604   CC9A                    CPA    FOUR                                   SCN007
0606   1803                    NOV    SCO1                                   SCN008
0608   66018F                  JMP/   PFULL     ERROR CONDITION              SCN009
060B   8094            SCO1    SBA    ONE                                    SCN010
060D   1103                    JAZ    SCO2      SCAN MODE SELECTED           SCN011
060F   6601B2                  JMP/   PARK                                   SCN012
0612   E096            SCO2    LDA    TWO       RESET INTERFACE CNTR         SCN013
0614   3968                    OBA    3,8                                    SCN014
0616   E092                    LDA    LON       REMOVE RESET                 SCN015
0618   3968                    OBA    3,8                                    SCN016
061A   87FFFC                  LDX=   X'FFFC'   SET AXIS COUNT = 0           SCN017
061D   E094            SCO3    LDA    ONE       INCREMENT INTERFACE COUNTER  SCN018
061F   3968                    OBA    3,8                                    SCN019
0621   E092                    LDA    LON       REMOVE SET                   SCN020
0623   3968                    OBA    3,8                                    SCN021
0625   44                      INX                                           SCN022
0626   44                      INX              INCREMENT AXIS COUNT         SCN023
0627   44                      INX                                           SCN024
0628   44                      INX                                           SCN025
0629   42                      ORB                                           SCN026
062A   4E                      TXA              TIME DELAY                   SCN027
062B   33088641                IBM    0,8,COORD+1,X   READ AXIS 3-LSB INTO MEMORY  SCN028
062F   33288642                IBM    1,8,COORD+2,X   READ AXIS 2-LSB INTO MEMORY  SCN029
0633   33488643                IBM    2,8,COORD+3,X   READ AXIS LSB INTO MEMORY    SCN030
0637   CF06                    CPV=   X'06'     AXIS COUNT = 3               SCN031
0639   18E2                    NOV    SCO3      FCRN, SCRN, ECRN, OR TCRN    SCN032
063B   67078A                  JMP=   CIRA                                   SCN036
                                                                             SCN037
063E           STATUS  DS      2                MODE SEL, ERROR COND, PICK IN CYCLE STATUS  SCN038
0640   CC0100 COORD   DC      X'000100'        X, Y, AND Z COORDINATES FROM DAC  SCN039
0643   000001                  DC      X'000001'                             SCN040
0646   000000                  DC      X'000000'                             SCN041
0649   010000                  DC      X'010000'                             SCN042
064C           FIRST   DS      12               INITIAL COORDINATES OF U-VECTOR
0658           SECON   DS      12               TERMINAL COORD OF U-VECTOR
```

AP810 VERSION 3.0

| Addr | Code | Label | Op | Operand | Comment | Seq |
|---|---|---|---|---|---|---|
| C664 | 0B | THIRD | DS | 12 | TERMINAL COORD OF V-VECTOR | SCN043 |
| C670 | | FOURT | DS | 12 | LAST SET OF COORD, WITHIN TOLERANCE | SCN044 |
| 067C | | DELTA | DS | 12 | U-VECTOR COMPONENTS | SCN045 |
| 0688 | | VDELT | DS | 12 | V-VECTOR COMPONENTS | SCN046 |
| 0694 | | KDELT | DS | 12 | (K)(U)-VECTOR COMPONENTS | SCN047 |
| 06A0 | | BDELT | DS | 12 | B-VECTOR COMPONENTS | SCN048 |
| 06AC | | PREV | DS | 12 | PREVIOUS COORD ON TAPE - BINARY | SCN049 |
| 06B8 | | CUREN | DS | 12 | CURRENT COORD - TAPE (BINARY) | SCN050 |
| 06C4 | | PBLCK | DS | 2 | X'FFFF' IF H-BLOCK OTHERWISE X'0000' | SCN051 |
| 06C6 | 0B | FCRN | RO4 | | FIRST COORDINATE RETURN | SCN053 |
| 06C7 | E0AE | | LDA | LOFF | | SCN054 |
| 06C9 | F1F9 | | STA | PBLCK | SET H-BLOCK FLAG | SCN055 |
| 06CB | 80A0 | | LDX | EIGHT | | SCN056 |
| 06CD | EE8640 | | LDV/ | COORD,X | | SCN057 |
| 06D0 | FE864C | | STV/ | FIRST,X | SET X0 = X  Y0 = Y  Z0 = Z | SCN058 |
| 06D3 | FE86B8 | | STV/ | CUREN,X | SET CUREN = X0, Y0, Z0 | SCN059 |
| 06D6 | 47 | | SWX | | | SCN060 |
| 06D7 | 1DF4 | | NXN | SC04 | | SCN061 |
| 06D9 | 6E0AD9 | | RTJ/ | DFVOL | DEFINED VOLUME CHECK | SCN062 |
| 06DC | 6E0BD1 | | RTJ/ | BTBCD | BINARY TO BCD CONVERSION | SCN063 |
| 06DF | 8098 | | LDX | THREE | SET COUNT = 3 | SCN064 |
| 06E1 | 08 | | R01 | | INCREMENT SEQ NO | SCN065 |
| 06E2 | EE876A | SC07 | LDV/ | HBPRTQ,X | ASCII EQUIV - SEQ NO DIGIT | SCN066 |
| 06E5 | 48 | | INA | | INCREMENT NEXT LSD OF SEQ NUMBER - ASCII | SCN067 |
| 06E6 | CFBA | | CPV= | X'BA' | | SCN068 |
| 06E8 | 1810 | | NOV | SC05 | | SCN069 |
| 06EA | EFB0 | | LDV= | X'B0' | DIGIT = 10 | SCN070 |
| 06EC | FE876A | | STV/ | HBPRTQ,X | SET DIGIT OF SEQ NUMBER = 0 IN ASCII | SCN071 |
| 06EF | 6ECA3C | | RTJ/ | ASCEIA | ASCII TO EIA CONVERSION | SCN072 |
| 06F2 | FE80D6 | | STV/ | SEQ,X | SAVE EIA DIGIT | SCN073 |
| 06F5 | 45 | | DCX | | DECREMENT COUNT | SCN074 |
| 06F6 | 1BEA | | NXZ | SC07 | | SCN075 |
| 06F8 | 6109 | | JMP | SC06 | COUNT = 0 | SCN076 |
| 06FA | EE876A | SC05 | STV/ | HBPRTQ,X | SAVE ASCII DIGIT | SCN077 |
| 06FD | 6ECA3C | | RTJ/ | ASCEIA | ASCII TO EIA CONVERSION | SCN078 |
| 0700 | FE80D6 | | STV/ | SEQ,X | SAVE EIA DIGIT | SCN079 |
| 0703 | F15F | SC06 | LDA | CPCT | | SCN080 |
| 0705 | F15F | | STA | NUMBER | | SCN081 |
| 0707 | A09E | | ADA | SEVEN | | SCN082 |
| 0709 | F159 | | STA | CPCT | | SCN083 |
| 070B | 8092 | | LDX | LON | SET COUNT = 0 | SCN084 |
| 070D | EE80D6 | SC08 | LDV/ | SEQ,X | READ H-NUMBER, G-CODE | SCN085 |

```
AP810 VERSION 3.0
0710  6E0C48            RTJ/  SIPQ              STORE IN PUNCH QUEUE           SCN086
0713  C09E              CPA   SEVEN                                            SCN087
0715  18F6              NOV   SC08              COUNT = 7                      SCN088
0717  E7076E            LDA=  HBPRTQ+4          SET PRINTQ.PTR = 5TH BYTE OF PRINTQ  SCN089
071A  F60BA7            STA/  PRINTQ                                           SCN090
071D  6E0B86            RTJ/  CTPQ              COORDINATES TO PUNCH QUEUE     SCN096
0720  8092              LDX   LON               SET COUNT = 0                  SCN097
0722  EE80E7     SC09   LDV/  MISC,X            READ F-WORD, M-FUNCTION        SCN098
0725  6E0C48            RTJ/  SIPQ              STORE IN PUNCH QUEUE           SCN099
0728  C0A0              CPA   EIGHT                                            SCN100
072A  18F6              NOV   SC09              COUNT = 8                      SCN101
072C  EF80              LDV=  X'80'             SET CHARACTER = EB             SCN102
072E  6E0C48            RTJ/  SIPQ              STORE IN PUNCH QUEUE           SCN103
0731  E7078C            LDA=  SCRN              SET COORD RETURN ADDRESS = SCRN SCN104
0734  F154              STA   CIRA                                             SCN105
0736  E60CD01    SC16   LDA/  PST               PUNCH STATUS                   
0739  070019            ANA=  X'0019'                                          
073C  1921              NAZ   SCN1                                             SCN109
073E  6E0C74            RTJ/  CONC              CONCURRENT TO HIGH SPEED PUNCH SCN110
0741  E6063E     SCN2   LDA/  STATUS                                           SCN111
0744  C70080            CPA=  X'0080'                                          SCN112
0747  1007              JOV   SC10              PICK IN CYCLE                  SCN113
0749  E11D              LDA   PICFLG                                           
074B  1909              NAZ   SC11              PICK CYCLE FLAG SET            SCN114
074D  6605FB     SC12   JMP/  SCAN                                             SCN115
                                                                               SCN116
0750  E0AE       SC10   LDA   LOFF                                             
0752  F114       SC13   STA   PICFLG            SET PICK CYCLE FLAG            
0754  61F7              JMP   SC12

0756  E706C6     SC11   LDA=  FCRN              SET COORD RETURN ADDRESS = FCRN SCN117
0759  F12F              STA   CIRA                                             SCN118
075B  E092              LDA   LON                                              SCN119
075D  61F3              JMP   SC13              RESET PICK CYCLE FLAG          SCN120

075F  6E0CA7     SCN1   RTJ/  PQLT              UPDATE PUNCH QUEUE LIGHTS
0762  61DD              JMP   SCN2
```

```
AP810 VERSION 3.0
0764              CPCT     DS    2              COORD PUNCH COUNT                      SCN124
0766   FFFC       NUMBER   DC    X'FFFC'        NUMBER OF X, Y, AND Z CHAR FOR PRINT QUEUE  SCN126
0768   0000       PICFLG   DC    X'0000'        SET TO X'FFFF' WHEN IN PICK CYCLE      SCN127
076A   C889       HBPRTQ   DC    X'C889'        STORAGE OF H-BLOCK PRINT CHARACTERS    SCN128
076C   B9B9                DC    X'B9B9'                                               SCN129
076E                       DS    28                                                    SCN130
078A              CIRA     DS    2              COORD 'INTERRUPT' RETURN ADDRESS       SCN132
078C   08         SCRN     RO4                                                         SCN133
078D   80A0                LDX   EIGHT                                                 SCN134
078F   EE8640     SC14     LDV/  COORD,X        SECOND COORDINATE RETURN               SCN135
0792   FE8658              STV/  SECON,X                                               SCN136
0795   FE86B8              STV/  CUREN,X        SET X1 = X  Y1 = Y  Z1 = Z             SCN137
0798   47                  SWX                  SET CUREN = X1, Y1, Z1                 SCN138
0799   1DF4                NXN   SC14                                                  SCN139
079B   6E0AD9              RTJ/  DFVOL          DEFINED VOLUME CHECK                   SCN140
079E   6E0B33              RTJ/  UDPR           CALCULATION OF (U)(U)                  SCN141
07A1   CF0000              CPV=  X'0000'        MIN LENGTH OF U-VECTOR = .003 INCHES   SCN142
07A4   0038                DC    X'0038'                                               SCN143
07A6   1003                JOV   SC15           (U) .003 INCHES                        SCN144
07A8   660736              JMP/  SC16           SKIP CALCULATIONS                      SCN145
07AB   6E085E              RTJ/  NORM           NORMALIZATION SUBROUTINE               SCN146
07AE   F10F                STA   UNOR                                                  SCN147
07B0   45                  DCX                                                         SCN148
07B1   4E                  TXA                                                         SCN149
07B2   4A                  OCA                                                         SCN150
07B3   F10C                STA   USHFT          TWO'S COMP OF NO OF U-SHIFTS           SCN151
07B5   6ECC5F              RTJ/  PBNHB          PUNCH BUT NOT H-BLOCK                  SCN152
07B8   E707C3     SC19     LDA=  ECRN           SET COORD RETURN ADDRESS = ECRN        SCN153
07BB   F1CD                STA   CIRA                                                  SCN154
07BD   61E9                JMP   SC17                                                  SCN155
07BF              UNOR     DS    2                                                     SCN158
07C1              USHFT    DS    2                                                     SCN159
07C3   08         ECRN     RO4                                                         SCN161
07C4   80A0                LDX   EIGHT                                                 SCN162
07C6   EE8640     SC18     LDV/  COORD,X        (U)(U)-NORM - (O1XX XXXX - ) - 16 BITS SCN163
07C9   FE8670              STV/  FOURT,X        TWO'S COMP - # OF U-SHIFTS FOR NORM    SCN164
07CC   47                  SWX                  'EXTRA' COORD RETURN                   SCN165
07CD   1DF7                NXN   SC18           SET X3 = X  Y3 = Y  Z3 = Z             SCN166
07CF   6E0AD9              RTJ/  DFVOL          DEFINED VOLUME CHECK                   SCN167
```

AP810 VERSION 3.0

| Addr | Code | Label | Op | Operand | Comment | Seq |
|------|------|-------|-----|---------|---------|-----|
| 07D2 | E7C7D7 | | LDA= | TCRN | SET COORD RETURN ADDRESS = TCRN | SCN168 |
| 07D5 | 61E4 | | JMP | SC19 | | SCN169 |
| 07D7 | 08 | TCRN | R04 | | THIRD COORD RETURN | SCN171 |
| 07D8 | 80A0 | | LDX | EIGHT | | SCN172 |
| 07DA | EE8640 | SC20 | LDV/ | COORD,X | SET X2 = X  Y2 = Y  Z2 = Z | SCN173 |
| 07DD | FE8664 | | STV/ | THIRD,X | | SCN174 |
| 07E0 | 47 | | SWX | | | SCN175 |
| 07E1 | 1DF7 | | NXN | SC20 | | SCN176 |
| 07E3 | 6ECAD9 | | RTJ/ | DFVOL | DEFINED VOLUME CHECK | SCN177 |
| 07E6 | EF0000 | | LDV= | X'0000' | CALCULATE (U)(V) | SCN178 |
| 07E9 | 0000 | | DC | X'0000' | SET (U)(V) = 0 | SCN179 |
| 07EB | F95C | | STV | UVPR | | SCN180 |
| 07ED | 80A0 | | LDX | EIGHT | | SCN181 |
| 07EF | EE8664 | SC20A | LDV/ | THIRD,X | | SCN182 |
| 07F2 | BE8658 | | SBV/ | SECON,X | | SCN183 |
| 07F5 | FE8688 | | STV/ | VDELT,X | COORDINATES OF (V) | SCN184 |
| 07F8 | 2A10 | | ALL | 16 | | SCN185 |
| 07FA | 96867C | | MUL/ | DELTA,X | | SCN186 |
| 07FD | A94A | | ADV | UVPR | PARTIAL SUM - (U)(V) | SCN187 |
| 07FF | F948 | | STV | UVPR | | SCN188 |
| C801 | 47 | | SWX | | | SCN189 |
| 0802 | 1DEB | | NXN | SC20A | | SCN190 |
| 0804 | 80A0 | | LDX | EIGHT | | SCN191 |
| 0806 | E941 | | LDV | UVPR | (U)(V) | SCN192 |
| 08C8 | 81B7 | | LDX | USHFT | TWO'S COMP OF NO OF U-SHIFTS | SCN193 |
| 080A | 6E085E | | RTJ/ | NORM | NORMALIZATION SUBROUTINE | SCN194 |
| 080D | 2603 | | LRL | 3 | NEEDED EXTRA FOR (U)(V)-NORM | SCN195 |
| 080F | F936 | | STV | UVNOR | (U)(V) - NORMALIZED | SCN196 |
| 0811 | 4E | | TXA | | | SCN197 |
| 0812 | A7000D | | ADA= | X'000D' | | SCN198 |
| 0815 | F13A | | STA | SHIFT | NET NUMBER OF SHIFTS - (U)(V)/(U)(U) | SCN199 |
| 0817 | E930 | | LDV | UVPR | | SCN200 |
| 0819 | 1C0B | | NAN | SC21 | | SCN201 |
| 081B | E930 | | LDV | UVNOR | | SCN202 |
| 081D | 4A | | OCA | | TWO'S COMPLEMENT ROUTINE | SCN203 |
| 081E | 48 | | OCB | | | SCN204 |
| 081F | AF0000 | | ADV= | X'0000' | | SCN205 |
| 0822 | 0001 | | DC | X'0001' | | SCN206 |
| C824 | F927 | | STV | UVNOR | | SCN207 |
| 0826 | E925 | SC21 | LDV | UVNOR | | SCN208 |
| 0828 | 9E07BF | | DIV/ | UNOR | | SCN209 |
| 082B | 2A10 | | ALL | 16 | | SCN210 |

```
AP810 VERSION 3.0
082D  F124              STA   SCALA                (U)(V)/(U)(U) - NORMALIZED      SCN211
082F  80A0              LDX   EIGHT                SET AXIS COUNT = 3              SCN212
0831  E6867C   NOR4     LDA/  DELTA,X              COMPONENTS OF U-VECTOR          SCN213
0834  911D              MUL   SCALA                K(U) - UNNORMALIZED             SCN214
0836  8ECC43            STX/  BTD4                                                 SCN215
0839  8116              LDX   SHIFT                                                SCN216
083B  131C              JXZ   SC22                 UNNORMALIZE K(U)                SCN217
083D  1505     SC24     JXN   SC23                 SHIFT COUNT = 0                 SCN218
083F  2E01              ARL   1                    SHIFT COUNT NEGATIVE            SCN219
0841  45                DCX                        SHIFT DOWN ONE BIT              SCN220
0842  61F7              JMP   SC24                 DECREMENT SHIFT COUNT           SCN221
0844  2A01     SC23     ALL   1                                                    SCN222
0846  44                INX                        SHIFT UP ONE BIT                SCN223
0847  61F2              JMP   SC24                 INCREMENT SHIFT COUNT           SCN224
0849           UVPR     DS    4                                                    SCN226
084D           UVNOR    DS    4                    (U)(V)                          SCN227
0851           SHIFT    DS    2                    (U)(V)-NORM - (0000 1XXX - ) - 32 BITS  SCN228
0853           SCALA    DS    2                    # V-SHIFTS - # U-SHIFTS WHEN NORMALIZING SCN229
0855           BSQUA    DS    4                    (U)(V)/(U)(U) - NORMALIZED      SCN230
                                                   (B)(B)                          
0859  860C43   SC22     LDX/  BTD4                                                 SCN234
085C  FE8694            STV/  KDELT,X              ((U)(V)/(U)(U))(U)              SCN235
085F  47                SWX                        DECREMENT AXIS COUNT            SCN236
0860  1DCF              NXN   SC25                 AXIS COUNT = 0                  SCN237
0862  EF0000            LDV=  X'0000'              SET UP FOR (B)(B)               SCN238
0865  0000              DC    X'0000'                                              SCN239
0867  F9EC              STV   BSQUA                                                SCN240
0869  80A0              LDX   EIGHT                                                SCN241
086B  EE8688   SC26     LDV/  VDELT,X                                              SCN242
086E  BE8694            SBV/  KDELT,X                                              SCN243
0871  2A10              ALL   16                                                   SCN244
0873  F686A0            STA/  BDELT,X                                              SCN245
0876  9686A0            MUL/  BDELT,X                                              SCN246
0879  A9DA              ADV   BSQUA                                                SCN247
087B  F9D8              STV   BSQUA                PARTIAL SUM - (B)(B)            SCN248
087D  47                SWX                                                        SCN249
087E  1DEB              NXN   SC26                                                 SCN250
0880  E9D3              LDV   BSQUA                (B)(B)                          SCN251
0882  C8EF              CPV   TOLSQ                TOLERANCE SQUARED               SCN252
0884  1026              JOV   OSTOL                OUTSIDE TOLERANCE               SCN253
```

AP810 VERSION 3.0

| | | | | | |
|---|---|---|---|---|---|
| 0886 | 80A0 | | LDX | EIGHT | SCN256 |
| 0888 | EE8688 | | LDV/ | VDELT,X | SCN257 |
| 088B | 1C07 | SC28 | NAN | SC27 | SCN258 |
| 088D | 4A | | OCA | | |
| 088E | 4B | | OCB | | TWO'S COMPLEMENT - VDELT | SCN260 |
| 088F | AF0000 | | ADV= | X'0000' | |
| 0892 | 0001 | | DC | X'0001' | |
| 0894 | 2A10 | | ALL | 16 | |
| 0896 | C73000 | SC27 | CPA= | X'3000' | 4.9152 INCHES |
| 0899 | 1011 | | JOV | OSTOL | ANY V-COMPONENT GREATER THAN 4.9152 INCHES |
| 089B | 47 | | SWX | | SCN264 |
| 089C | 1DEA | | NXN | SC28 | SCN265 |
| | | | | | |
| 089E | 80A0 | SC31 | LDX | EIGHT | SCN268 |
| 08A0 | EE8664 | SC29 | LDV/ | THIRD,X | SCN269 |
| 08A3 | FE8670 | | STV/ | FOURT,X | SET X3 = X2  Y3 = Y2  Z3 = Z2 | SCN270 |
| 08A6 | 47 | | SWX | | SCN271 |
| 08A7 | 1DF7 | | NXN | SC29 | SCN272 |
| 08A9 | 660736 | | JMP/ | SC16 | SCN273 |
| 08AC | 80A0 | OSTOL | LDX | EIGHT | OUTSIDE TOLERANCE | SCN275 |
| 08AE | EE8670 | | LDV/ | FOURT,X | |
| 08B1 | BE8658 | | SBV/ | SECON,X | |
| 08B4 | 1A05 | | NBZ | SC30A | P3 = P1 |
| 08B6 | 47 | | SWX | | |
| 08B7 | 1DF5 | | NXN | OSTOL+2 | ALL THREE AXES CHECKED |
| 08B9 | 61E3 | | JMP | SC31 | |
| 08BB | 80A0 | SC30A | LDX | EIGHT | |
| 08BD | EE8658 | SC30 | LDV/ | SECON,X | |
| 08C0 | FE864C | | STV/ | FIRST,X | SET X0 = X1  Y0 = Y1  Z0 = Z1 | SCN276 |
| 08C3 | EE8670 | | LDV/ | FOURT,X | SCN277 |
| 08C6 | FE8688 | | STV/ | CUREN,X | SET CUREN = X3, Y3, Z3 | SCN278 |
| 08C9 | FE8658 | | STV/ | SECON,X | SET X1 = X3  Y1 = Y3  Z1 = Z3 | SCN279 |
| 08CC | 47 | | SWX | | SCN280 |
| 08CD | 1DEE | | NXN | SC30 | SCN281 |
| 08CF | 6E0B33 | | RTJ/ | UDPR | DETERMINE NEW U-VECTOR = (U)(U) | SCN282 |
| 08D2 | 6E085E | | RTJ/ | NORM | NORMALIZATION SUBROUTINE | SCN283 |
| 08D5 | F6078F | | STA/ | UNOR | | SCN284 |
| 08D8 | 45 | | DCX | | SCN285 |
| 08D9 | 4E | | TXA | | SCN286 |
| 08DA | 4A | | OCA | | SCN287 |
| | | | | | SCN288 |

AP810 VERSION 3.0

| Addr | Hex | Label | Op | Operand | Comment | Ref |
|---|---|---|---|---|---|---|
| 08DB | F607C1 | | STA/ | USHFT | TWO'S COMP OF NO OF U-SHIFTS | SCN289 |
| 08DE | 6E0C5F | DV9 | RTJ/ | PBNHB | PUNCH BUT NOT H-BLOCK | SCN290 |
| 08E1 | 0B | | RO4 | | | SCN291 |
| 08E2 | 61BA | | JMP | SC31 | | SCN292 |
| | | | | | | |
| 0AD9 | 0000 | DFVOL | DC | ** | DEFINED VOLUME CHECK | DFV088 |
| 0ADB | 0B | | RO4 | | | DFV089 |
| 0ADC | 80A0 | | LDX | EIGHT | SET AXIS COUNT = 3 | DFV090 |
| 0ADE | EE8640 | DV2 | LDV/ | COORD,X | | DFV091 |
| 0AE1 | CE80BE | | CPV/ | LOW,X | AXIS COORDINATE OR = AXIS LOW LIMIT | DFV092 |
| 0AE4 | 1814 | | NOV | DV1 | | DFV093 |
| 0AE6 | CE80CA | | CPV/ | HIGH,X | AXIS COORDINATE = AXIS HIGH LIMIT | DFV094 |
| 0AE9 | 100F | | JOV | DV1 | | DFV095 |
| 0AEB | 47 | | SWX | | DECREMENT AXIS COUNT | DFV096 |
| 0AEC | 10F0 | | NXN | DV2 | AXIS COUNT = 0 | DFV097 |
| 0AEE | E092 | | LDA | LON | RESET OUTSIDE DEFINED VOLUME FLAG | DFV098 |
| 0AF0 | F104 | | STA | DV3 | DEFINED VOLUME LIGHT ON | DFV099 |
| 0AF2 | 3948 | | OBA | 2,8 | | DFV100 |
| 0AF4 | 63E3 | | JMP* | DFVOL | RETURN | DFV101 |
| 0AF6 | FFFF | DV3 | DC | X'FFFF' | X'0000' - IF INSIDE DV | DFV102 |
| 0AF8 | 0000 | DV5 | DC | X'0000' | X'FFFF' - FIRST POINT OUTSIDE DV | DFV103 |
| 0AFA | E0AE | DV1 | LDA | LOFF | DEFINED VOLUME LIGHT OFF | DFV104 |
| 0AFC | 3948 | | OBA | 2,8 | | DFV105 |
| 0AFE | E1F6 | | LDA | DV3 | | DFV106 |
| 0B00 | 1906 | | NAZ | DV4 | FIRST POINT OUTSIDE DEFINED VOLUME | DFV107 |
| 0B02 | E0AE | | LDA | LOFF | | DFV108 |
| 0B04 | F1F2 | | STA | DV5 | SET OUTSIDE DEFINED VOLUME FLAG | DFV109 |
| 0B06 | F1EE | | STA | DV3 | SET FIRST PT OUTSIDE DEF VOL FLAG | DFV110 |
| 0B08 | E0BC | DV4 | LDA | ENCODE | | DFV111 |
| 0BCA | 14C2 | | JAN | DV6 | ENCODE | DFV112 |
| 0BCC | 63CB | | JMP* | DFVOL | RETURN | DFV113 |
| 0B0E | E1E8 | DV6 | LDA | DV5 | | DFV114 |
| 0B10 | 1403 | | JAN | DV7 | FIRST POINT OUTSIDE DEFINED VOLUME | DFV115 |
| 0B12 | 66C736 | | JMP/ | SC16 | CALCULATIONS TERMINATED | DFV116 |
| 0B15 | E0AE | | LDA | LOFF | | DFV117 |
| 0B17 | 3928 | | OBA | 1,8 | INITIATE AUTO PICK CYCLE | DFV118 |
| 0B19 | E092 | | LDA | LON | | DFV119 |
| 0B1B | 3928 | | OBA | 1,8 | | DFV120 |
| 0B1D | F1D9 | | STA | DV5 | RESET FIRST PT OUTSIDE DEF VOL FLAG | DFV121 |
| 0B1F | E7C6C6 | | LDA= | FCRN | | DFV122 |
| 0B22 | E6078A | | STA/ | CIRA | SET COORDINATE RETURN ADDRESS = FCRN | DFV123 |
| 0B25 | 8CA0 | | LDX | EIGHT | | DFV124 |
| 0B27 | EE8670 | DV8 | LDV/ | FOURT,X | | DFV125 |

AP810 VERSION 3.0

| Addr | Code | Label | Op | Operand | Comment | Ref |
|------|------|-------|-----|---------|---------|-----|
| 0B2A | FE86B8 | | STV/ | CUREN,X | SET CUREN = X3, Y3, Z3 | DFV126 |
| 0B2D | 47 | | SWX | | | DFV127 |
| 0B2E | 1DF7 | | NXN | DV8 | | DFV128 |
| 0B30 | 6608DE | | JMP/ | DV9 | | DFV129 |
| 0B33 | 0000 | UDPR | DC | ** | (U)(U) DOT PRODUCT | UDP064 |
| 0B35 | 0B | | R04 | | | UDP065 |
| 0B36 | EF0000 | | LDV= | X'0000' | | UDP066 |
| 0B39 | 0000 | | DC | X'0000' | | UDP067 |
| 0B3B | F91D | | STV | USQUA | INITIALIZE USQUA | UDP068 |
| 0B3D | 8CA0 | | LDX | EIGHT | SET COUNT = 3 | UDP069 |
| 0B3F | EE8658 | | LDV/ | SECON,X | LAST AXIS VALUE ON TAPE | UDP070 |
| 0B42 | BE864C | | SBV/ | FIRST,X | SECOND PREVIOUS AXIS VALUE ON TAPE | UDP071 |
| 0B45 | 2A10 | | ALL | 16 | | UDP072 |
| 0B47 | F6867C | | STA/ | DELTA,X | U-VECTOR COMPONENT | UDP073 |
| 0B4A | 96867C | | MUL/ | DELTA,X | | UDP074 |
| 0B4D | A908 | | ADV | USQUA | PARTIAL SUM — DOT PRODUCT | UDP075 |
| 0B4F | F909 | | STV | USQUA | DECREMENT COUNT | UDP076 |
| 0B51 | 47 | | SWX | | COUNT = 0 | UDP077 |
| 0B52 | 10EB | | NXN | UDPR1 | DOT PRODUCT OF U-VECTOR WITH ITSELF | UDP078 |
| 0B54 | E904 | | LDV | USQUA | | UDP079 |
| 0B56 | 8092 | | LDX | LON | | UDP080 |
| 0B58 | 63D9 | | JMP* | UDPR | RETURN | UDP081 |
| 0B5A | | USQUA | DS | 4 | (U)(U) | UDP082 |
| 0B5E | 0000 | NORM | DC | ** | NORMALIZATION SUBROUTINE | NOR060 |
| 0B60 | 0B | | R04 | | | NOR061 |
| 0B61 | 1C07 | | NAN | NOR1 | | NOR062 |
| 0B63 | 4A | | OCA | | TWO'S COMPLEMENT | NOR063 |
| 0B64 | 48 | | OCB | | | NOR064 |
| 0B65 | AF0000 | | ADV= | X'0000' | | NOR065 |
| 0B68 | 0001 | | DC | X'0001' | | NOR066 |
| 0B6A | 190E | NOR1 | NAZ | NOR2 | DATA = 65,536 | NOR067 |
| 0B6C | 1AC6 | | NBZ | NOR3 | DATA = 0 | NOR068 |
| 0B6E | F60853 | | STA/ | SCALA | SET K = 0 | NOR069 |
| 0B71 | 66C82F | | JMP/ | NOR4 | | NOR070 |
| 0B74 | 2A10 | NOR3 | ALL | 16 | SHIFT DATA UP 16 BITS | NOR071 |
| 0B76 | 46 | | AWX | | INCREASE COUNT BY 16 | NOR072 |
| 0B77 | 46 | | AWX | | | NOR073 |
| 0B78 | 46 | | AWX | | | NOR074 |
| 0B79 | 46 | | AWX | | | NOR075 |
| 0B7A | 1405 | NOR2 | JAN | NOR5 | DATA NEGATIVE | NOR076 |
| 0B7C | 2A01 | | ALL | 1 | SHIFT DATA UP 1 BIT | NOR077 |
| 0B7E | 44 | | INX | | INCREMENT COUNT | NOR078 |

AP810 VERSION 3.0

| Addr | Code | Label | Op | Operand | Comment | Ref |
|---|---|---|---|---|---|---|
| 0B7F | 61F9 | | JMP | NOR2 | | NOR079 |
| 0B81 | 2601 | NOR5 | LRL | 1 | SHIFT DATA DOWN 1 BIT | NOR080 |
| 0B83 | 45 | | DCX | | DECREMENT COUNT | NOR081 |
| 0B84 | 63D8 | | JMP* | NORM | RETURN | NOR082 |
| | | | | | | |
| 0B86 | 0000 | CTPQ | DC | ** | COORD TO PUNCH QUEUE | CTP059 |
| 0B88 | 08 | | R01 | | | CTP060 |
| 0B89 | E606C4 | | LDA/ | PBLCK | H-BLOCK FLAG | CTP061 |
| 0B8C | 2610 | CPQ2 | LRL | 16 | | CTP062 |
| 0B8E | EB25 | | LDV* | TRVST | READ DATA FROM TEMPORARY STORAGE | CTP063 |
| 0B90 | 7923 | | DWM | TRVST | DECREMENT TRVST POINTER | CTP064 |
| 0B92 | AFB0 | | ADV= | X'B0' | BCD TO ASCII CONVERSION | CTP065 |
| 0B94 | 12C4 | | JBZ | CPQ1 | H-BLOCK | CTP066 |
| 0B96 | FB0F | | STV* | PRINTQ | DATA TO H-BLOCK PRINT QUEUE | CTP067 |
| 0B98 | 710D | | IWM | PRINTQ | INCREMENT PRINTQ POINTER | CTP068 |
| 0B9A | 6E0A3C | CPQ1 | RTJ/ | ASCEIA | ASCII TO EIA CONVERSION | CTP069 |
| 0B9D | 6ECC48 | | RTJ/ | SIPQ | STORE CHAR IN PUNCH QUEUE | CTP070 |
| 0BA0 | C60764 | | CPA/ | CPCT | | CTP071 |
| 0BA3 | 18E4 | | NOV | CPQ2 | COUNT = COORDINATE COUNT | CTP072 |
| 0BA5 | 63DF | | JMP* | CTPQ | RETURN | CTP073 |
| 0BA7 | | PRINTQ | DS | 2 | ADDRESS OF NEXT CHAR - PRINT QUEUE | CTP074 |
| 0BA9 | 0000 | TEMPST | DC | ** | TEMP STORAGE - PUNCH COORD | TEM031 |
| 0BAB | 08 | | R01 | | | TEM032 |
| 0BAC | 7107 | | IWM | TRVST | INCREMENT TRVST POINTER | TEM033 |
| 0BAE | FB05 | | STV* | TRVST | DATA TO TEMPORARY STORAGE | TEM034 |
| 0BB0 | 760764 | | IWM/ | CPCT | INCREMENT COORD COUNT | TEM035 |
| 0BB3 | 63F4 | | JMP* | TEMPST | RETURN | TEM036 |
| 0BB5 | | TRVST | DS | 28 | TEMP STORAGE - REVERSE ORDER | TEM037 |
| | | | | | | |
| 0BD1 | 0000 | BTBCD | DC | ** | BINARY TO BCD CONV - Z, Y, X | BTB083 |
| 0BD3 | 0B | | R04 | | | BTB084 |
| 0BD4 | E092 | | LDA | LON | | BTB085 |
| 0BD6 | F6C764 | | STA/ | CPCT | SET COORD COUNT = 0 | BTB086 |
| 0BD9 | E70BB6 | | LDA= | TRVST+1 | | BTB087 |
| 0BDC | F1D7 | | STA | TRVST | INITIALIZE TRVST POINTER | BTB088 |
| 0BDE | 80A0 | | LDX | EIGHT | SET AXIS COUNT = 3 | BTB089 |
| 0BE0 | E606C4 | | LDA/ | PBLCK | H-BLOCK | BTB090 |
| 0BE3 | 1416 | BTD2 | JAN | BTD1 | | BTB091 |
| 0BE5 | EE86B8 | | LDV/ | CUREN,X | | BTB092 |
| 0BE8 | 8E86AC | | SBV/ | PREV,X | | BTB093 |
| 0BEB | 19CE | | NAZ | BTD1 | | BTB094 |

```
AP810 VERSION 3.0
0BED  1A0C                    NBZ              CURRENT AXIS VALUE = PREVIOUS AXIS VALUE   BTB095
0BEF  C8          BTD7        RO4                                                         BTB096
0BF0  794F                    DWM   AXCT       DECREMENT AXIS COUNT                       BTB097
0BF2  47                      SWX                                                         BTB098
0BF3  1DEB                    NXN   BTD2                                                  BTB099
0BF5  EC96                    LDA   TWO        AXIS COUNT = 0                             BTB100
0BF7  F148                    STA   AXCT       SET AXIS COUNT = 3                         BTB101
0BF9  63D6                    JMP*  BTBCD      RETURN                                     BTB102

0BFB  E0F9        BTD1        LDA   SCALE                                                 BTB105
0BFD  A72A00                  ADA=  X'2A00'    I1 = X'0002'                               BTB106
0C00  F106                    STA   BTD3                                                  BTB107
0C02  EE86B8                  LDV/  CUREN,X                                               BTB108
0C05  FE86AC                  STV/  PREV,X     SET PREV AXIS VALUE = CUR AXIS VALUE       BTB109
0C08  2A02        BTD3        DC    X'2A02'    SHIFT ACCORDING TO SCALE FACTOR CODE       BTB110
0C0A  9F03E8                  DIV=  X'03E8'    DIVIDE BY 1000
0C0D  2210                    LLL   16                                                    BTB112
0C0F  F132                    STA   BTD4       TEMPORARY QUOTIENT (Q1)                    BTB113
0C11  E092                    LDA   LON                                                   BTB114
0C13  98A4                    DIV   TEN        DIV REMAINDER (R1) BY TEN                  BTB115
0C15  6992                    RTJ   TEMPST     TEMPORARY STORAGE (R2)                     BTB116
0C17  E092                    LDA   LON        CLEAR A
0C19  98A4                    DIV   TEN        DIVIDE SECOND QUOTIENT BY 10
0C1B  698C                    RTJ   TEMPST     TEMPORARY STORAGE (R3)
0C1D  E124                    LDA   BTD4       (Q1)                                       BTB117
0C1F  2210                    LLL   16                                                    BTB118
0C21  6986                    RTJ   TEMPST     TEMPORARY STORAGE (Q2)                     BTB119
0C23  1209                    JBZ   BTD5       QUOTIENT (Q1) = 0                          BTB120
0C25  E092                    LDA   LON                                                   BTB121
0C27  98A4                    DIV   TEN        DIV QUOTIENT (Q1) BY TEN                   BTB122
0C29  6ECBA9                  RTJ/  TEMPST     TEMPORARY STORAGE (R1)                     BTB123
0C2C  61F5                    JMP   BTD6                                                  BTB124
0C2E  EFF8        BTD5        LDV=  X'FB'      SET DATA = PLUS SIGN                       BTB125
0C30  6E0BA9                  RTJ/  TEMPST     TEMPORARY STORAGE                          BTB126
0C33  890E                    STX   BTD4       TEMP STORAGE - X-REGISTER                  BTB127
0C35  810A                    LDX   AXCT                                                  BTB128
0C37  EE8C45                  LDV/  AXIS,X     SET DATA = AXIS                            BTB129
0C3A  8107                    LDX   BTD4                                                  BTB130
0C3C  6E0BA9                  RTJ/  TEMPST     TEMPORARY STORAGE                          BTB131
0C3F  61AE                    JMP   BTD7                                                  BTB132

0C41  0002        AXCT        DC    X'0002'    AXIS COUNT                                 BTB135
0C43              BTD4        DS    2          TEMP STORAGE - USED SEVERAL PLACES         BTB136
0C45  28292A      AXIS        DC    X'28292A'  (ASCII - '80') FOR X, Y, Z                 BTB137
```

AP810 VERSION 3.0

| | | | | | |
|---|---|---|---|---|---|
| 0C48 | 0000 | SIPQ | DC | ** | STORE CHAR IN PUNCH QUEUE | SIP050 |
| 0C4A | 08 | | ROI | | | SIP051 |
| 0C4B | FAB8 | | STV* | PQUE | CHAR TO PUNCH QUEUE | |
| 0C4D | E0B8 | | LDA | PQUE | | SIP056 |
| 0C4F | C0B6 | | CPA | LAPQ | | SIP057 |
| 0C51 | 10C6 | | JOV | SIP1 | PQUE POINTER = LAPQ | SIP058 |
| 0C53 | 70B8 | | IHM | PQUE | INCREMENT PQUE POINTER | |
| 0C55 | 44 | SIP2 | INX | | INCREMENT COUNT | SIP061 |
| 0C56 | 4E | | TXA | | | SIP062 |
| 0C57 | 63EF | | JMP* | SIPQ | RETURN | |
| | | | | | | SIP063 |
| 0C59 | E0B4 | SIP1 | LDA | FAPQ | | SIP064 |
| 0C5B | F0B8 | | STA | PQUE | SET PQUE = FAPQ | SIP065 |
| 0C5D | 61F6 | | JMP | SIP2 | | |
| 0C5F | 0000 | PBNHB | DC | ** | PARTIAL BLOCK TO PUNCH QUEUE | PBN038 |
| 0C61 | E092 | | LDA | LON | | PBN039 |
| 0C63 | F606C4 | | STA/ | PBLCK | RESET H-BLOCK FLAG | PBN040 |
| 0C66 | 6E08D1 | | RTJ/ | BTBCD | BINARY TO BCD CONVERSION | PBN041 |
| 0C69 | 8092 | | LDX | LON | | PBN042 |
| 0C6B | 6E0B86 | | RTJ/ | CIPQ | COORD TO PUNCH QUEUE | PBN043 |
| 0C6E | EF80 | | LDV= | X'80' | SET CHAR = E8 | PBN044 |
| 0C70 | 69D6 | | RTJ | SIPQ | STORE CHAR IN PUNCH QUEUE | PBN045 |
| 0C72 | 63EB | | JMP* | PBNHB | RETURN | PBN046 |
| | | | | | | |
| 0C74 | 0000 | CONC | DC | ** | CONCURRENT OUTPUT TO HIGH SPEED PUNCH | CON074 |
| 0C76 | E0F3 | | LDA | PUNCH | | CON075 |
| 0C78 | 1423 | | JAN | CON1 | PUNCH | CON076 |
| 0C7A | 3983 | | OBA | 4,3 | STOP CONC OUTPUT TO PUNCH | CON078 |
| 0C7C | 05 | | EIN | | ARM INTERRUPT SYSTEM | |
| 0C7D | 3943 | | OBA | 2,3 | ARM PUNCH CONTROLLER INTERRUPT | |
| 0C7F | E0B6 | | LDA | LAPQ | | CON079 |
| 0C81 | C0CC | | CPA | CAD | LAPQ OR = CAD | CON080 |
| 0C83 | 1004 | | JOV | CON2 | | CON081 |
| 0C85 | E0B4 | | LDA | FAPQ | | CON082 |
| 0C87 | F0CC | | STA | CAD | SET CAD = FAPQ | CON083 |
| 0C89 | E0B8 | CON2 | LDA | PQUE | | CON084 |
| 0C8B | C0CC | | CPA | CAD | | CON085 |
| 0C8D | 1814 | | NOV | CON3 | PQUE OR = CAD | CON086 |
| 0C8F | B094 | | SBA | ONE | | CON087 |
| 0C91 | F0CE | | STA | EAD | SET EAD = PQUE-1 | CON088 |
| 0C93 | C0CC | | CPA | CAD | | CON089 |

```
AP810 VERSION 3.0
0C95  1802              NOV   CON4              EAD  OR = CAD                    CON090
0C97  39C3              OBA   6,3               START CONC OUTPUT TO PUNCH       CON091
0C99  690C              RTJ   PQLT              PUNCH QUEUE LIGHTS
0C98  63D7       CON4   JMP*  CONC              RETURN                           CON110

0C9D  E088       CON1   LDA   PQUE              PUNCH - NO                       CON111
0C9F  F00C              STA   CAD               SET CAD = PQUE                   CON112
0CA1  63D1              JMP*  CONC              RETURN                           CON113

0CA3  E086       CON3   LDA   LAPQ              SET EAD = LAPQ                   CON120
0CA5  61EA              JMP   CON11                                              CON121
                 ****  P U N C H   Q U E U E   L I G H T S ****

0CA7  0000       PQLT   DC    **                ENTRY                            CON077
0CA9  08                R01                     PUNCH - YES
0CAA  E088              LDA   PQUE                                               CON093
0CAC  B00C              SBA   CAD                                                CON094
0CAE  1C04              NAN   CON5                                               CON095
0CB0  B0B4              SBA   FAPQ                                               CON096
0CB2  A086              ADA   LAPQ              ABSOLUTE VALUE OF PQUE - CAD     CON097
0CB4  1118              JAZ   CON6              PQUE = CAD                       CON098
0CB6  F0BA       CON5   STA   EMPTY             RESET PUNCH QUEUE EMPTY FLAG     CON099
0CB8  C70400            CPA=  X'0400'           PQUE - CAD = 1024                CON100
0CBB  1817              NOV   CON7                                               CON101
0CBD  C707A0            CPA=  X'07A0'           PQUE - CAD = 1952                CON102
0CC0  1816              NOV   CON8                                               CON103
0CC2  C70B40            CPA=  X'0B40'           PQUE - CAD = 2880                CON104
0CC5  1815              NOV   CON9                                               CON105
0CC7  EFF0              LDV=  X'F0'             SET ALL PUNCH QUEUE LIGHTS ON    CON106
0CC9  3908              OBA   0,8                                                CON107
0CCB  66018F            JMP/  PFULL             PUNCH QUEUE FULL

0CCE  EFFF       CON6   LDV=  X'FF'             SET ALL PUNCH QUEUE LIGHTS OFF   CON108
0CD0  3908       CON10  OBA   0,8                                                CON109
0CD2  63D3              JMP*  PQLT              RETURN

0CD4  EFFE       CON7   LDV=  X'FE'             SET FIRST PUNCH QUEUE LIGHT ON   CON114
0CD6  61F8              JMP   CON10                                              CON115
```

What is claimed is:

1. A method for utilizing a programmed computer and a scanning apparatus to approximate a curvature of a three-dimensional surface within a predetermined tolerance, the method for operating the scanning apparatus and the computer comprising of the steps of:
   a. scanning the curvature of the three-dimensional surface to produce a plurality of sample points;
   b. storing a first two sample points to define a first linear segment therebetween;
   c. computing for a successive sample point the magnitude of a perpendicular from the successive sample point to a line coincident with a previously defined linear segment;
   d. comparing the magnitude of the perpendicular with the predetermined tolerance;
   e. iterating steps (c) and (d) to detect a first of the successive sample points having a magnitude of the perpendicular in excess of the predetermined tolerance;
   f. storing a final sample point detected immediately prior to the first of the successive sample points thereby defining a successive linear segment from an end point of a previously defined linear segment to the final sample point; and
   g. iterating steps (c) through (f) to define further linear segments thereby approximating the complete curvature of the three-dimensional surface.

2. A method for utilizing a programmed computer and a scanning apparatus to approximate a curvature of a three-dimensional surface within a predetermined tolerance, the method for operating the scanning apparatus and the computer comprising the steps of:
   a. scanning the curvature of the three-dimensional surface to produce a plurality of sample points;
   b. storing a first two sample points to define a first linear segment therebetween;
   c. calculating a reference vector coincident with a previously defined linear segment;
   d. calculating for a successive sample point a test vector from an end point of the previously defined linear segment to said successive point;
   e. computing for the test vector a third vector defined by a projection of the test vector onto a line coincident with the reference vector;
   f. subtracting the third vector from the test vector to produce a difference magnitude;
   g. comparing the difference magnitude with the predetermined tolerance;
   h. iterating steps (d) through (g) to determine a first sample point with a corresponding difference magnitude in excess of the predetermined tolerance;
   i. storing a final sample point detected immediately prior to the first sample point thereby defining a successive linear segment from an end point of the proceeding linear segment to the final sample point;
   j. iterating steps (c) through (i) to define further linear segments thereby approximating the complete curvature of the three-dimensional surface.

3. A method for utilizing a scanning apparatus providing input data signals to a computer programmed to produce a plurality of data points to a peripheral device being operative to permanently store the data points, said data points defining linear segments approximating a curvature of a three dimensional surface within a predetermined tolerance, the method comprising the steps of:
  a. moving the scanning apparatus in three dimensional space over the curvature to generate a first set of input signals representing coordinate values of a first two data points;
  b. storing the first set of input signals in the computer;
  c. operating the peripheral device to permanently store the first set of input signals thereby defining a first linear segment between the first two data points, said linear segment representing an axis of a cylindrical boundary having a radius equal to the predetermined tolerance;
  d. moving the scanning apparatus over the curvature to generate successive sets of input signals representing coordinate values of sample points;
  e. calculating in response to the first set of input signals and each of the subsequent sets of input signals an output signal representing a successive data point, said successive data point corresponding to a final sample point on the curvature lying within the cylindrical boundary;
  f. operating the peripheral device to permanently store the successive data point thereby defining a successive linear segment between an end point of a previously defined linear segment and the successive data point, said successive linear segment representing a successive axis of a cylindrical boundary having a radius equal to the predetermined tolerance; and
  g. iterating steps (d) through (f) to generate the plurality of data points defining the linear segments for approximating the curvature of the three dimensional surface within the predetermined tolerance.

4. A method for utilizing a scanning apparatus providing input data to a computer programmed to produce a plurality of data points to a peripheral device being operative to permanently store said data points, said data points defining linear segments approximating a curvature of a three dimensional surface within a predetermined tolerance, the method comprising the steps of:
  a. moving the scanning apparatus in three dimensional space over the curvature to generate a first set of coordinate values of a first two data points;
  b. storing the coordinate values of the first two data points in the computer;
  c. operating the peripheral device to permanently store the coordinate values of the first two data points thereby defining a first linear segment therebetween, said first linear segment representing a first linear approximation of the curvature;
  d. moving the scanning apparatus over the curvature to generate successive sets of coordinate values of successive data points;
  e. calculating in the computer using the coordinate values of both the first two data points and each successive data point the magnitude of a perpendicular from a successive data point to a line coincident with a previously defined linear segment;
  f. comparing in the computer each perpendicular magnitude with the magnitude of the predetermined tolerance;
  g. detecting in the computer a final perpendicular magnitude closest to but less than the magnitude of the predetermined tolerance;
  h. operating the peripheral device to permanently store the coordinate values of a final successive data point corresponding to the final perpendicular magnitude, said final successive data point defining a successive linear segment from an end point of a previously defined linear segment to the final successive data point; and
  i. iterating steps (d) through (h) to generate the plurality of data points defining a number of linear segments approximating the curvature of the three dimensional surface within the predetermined tolerance.

5. A method for utilizing a scanning apparatus providing input data to a computer programmed to produce a plurality of data points to a peripheral device for permanently storing said data points, said data points defining linear segments approximating a curvature of a three dimensional surface within a predetermined tolerance, the method comprising the steps of:
  a. moving the scanning apparatus in three dimensional space over the curvature to generate coordinate values of a first two data points;
  b. storing the coordinate values of the first two data points in the computer;
  c. operating the peripheral device to permanently store the coordinate values of the first two data points to define a first linear segment therebetween;
  d. moving the scanning apparatus over the curvature to generate coordinate values of a successive data point;
  e. calculating a unity reference vector coincident with a previously defined linear segment;
  f. calculating a test vector from an end point of a previously defined linear segment to the successive data point;
  g. computing the magnitude of a perpendicular from the head of the test vector to a line coincident with the reference vector;
  h. comparing the magnitude of the perpendicular with the magnitude of the predetermined tolerance;
  i. iterating steps (d) through (h) and selecting a final successive data point having a corresponding magnitude of the perpendicular closest to but less than the magnitude of the predetermined tolerance;
  j. operating the peripheral device to permanently store the final successive data point thereby defining a successive linear segment from an end point of the previously defined linear segment to the final successive data point; and
  k. iterating steps (d) through (j) to generate the plurality of data points defining linear segments approximating the curvature of three dimensional surface within the predetermined tolerance.

* * * * *